(12) United States Patent
Tago et al.

(10) Patent No.: US 10,322,316 B2
(45) Date of Patent: Jun. 18, 2019

(54) GOLF BALL

(71) Applicant: Bridgestone Sports Co., Ltd., Tokyo (JP)

(72) Inventors: Takanori Tago, Chichibushi (JP); Atsushi Nanba, Chichibushi (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 2 days.

(21) Appl. No.: 15/615,190

(22) Filed: Jun. 6, 2017

(65) Prior Publication Data

US 2017/0368420 A1  Dec. 28, 2017

(30) Foreign Application Priority Data

Jun. 23, 2016  (JP) .................... 2016-124406

(51) Int. Cl.
*A63B 37/06* (2006.01)
*A63B 37/00* (2006.01)
*C08L 23/08* (2006.01)

(52) U.S. Cl.
CPC ...... *A63B 37/0059* (2013.01); *A63B 37/0033* (2013.01); *A63B 37/0036* (2013.01); *A63B 37/0038* (2013.01); *A63B 37/0074* (2013.01); *A63B 37/0075* (2013.01); *C08L 23/0876* (2013.01); *A63B 37/0003* (2013.01); *A63B 37/0048* (2013.01); *A63B 37/0095* (2013.01); *A63B 37/0096* (2013.01); *C08L 2205/025* (2013.01)

(58) Field of Classification Search
CPC .................................................. A63B 37/0023
USPC .......................................................... 473/378
See application file for complete search history.

(56) References Cited

U.S. PATENT DOCUMENTS

| 6,500,495 | B2 | 12/2002 | Lutz | |
|---|---|---|---|---|
| 8,617,639 | B2 | 12/2013 | Nakajima et al. | |
| 2008/0020864 | A1* | 1/2008 | Shindo | C08K 5/09 473/373 |
| 2009/0286629 | A1* | 11/2009 | Petrichko | A63B 37/0044 473/378 |
| 2013/0109505 | A1* | 5/2013 | Wachi | A63B 37/0022 473/374 |

FOREIGN PATENT DOCUMENTS

| JP | 2002-509161 A | 3/2002 |
|---|---|---|
| JP | 4514491 B2 | 7/2010 |
| JP | 2013-094666 A | 5/2013 |
| JP | 2013-094668 A | 5/2013 |

* cited by examiner

*Primary Examiner* — Raeann Gorden
(74) *Attorney, Agent, or Firm* — Sughrue Mion, PLLC

(57) ABSTRACT

In a golf ball having a core and a cover of at least one layer, the core and/or at least one layer of the cover are formed of a resin composition that includes (A) 100 parts by weight of a thermoplastic resin, and (B) 1 to 30 parts by weight of a compound having a fluorene skeleton, or a derivative thereof. This resin composition for golf balls has an improved injection-moldability and thus enables the ball to achieve both a reduced spin rate and a good durability (scuff resistance).

9 Claims, No Drawings

GOLF BALL

CROSS-REFERENCE TO RELATED APPLICATION

This non-provisional application claims priority under 35 U.S.C. § 119(a) on Patent Application No. 2016-124406 filed in Japan on Jun. 23, 2016, the entire contents of which are hereby incorporated by reference.

TECHNICAL FIELD

This invention relates to a golf ball having a core of one or more layer and a cover of one or more layer. More particularly, the invention relates to a golf ball in which the core and/or cover are formed of specific resin compositions, thereby endowing the ball with good properties.

BACKGROUND ART

Golf ball resin compositions are employed particularly as cover-forming materials that are injection-molded over the ball core. In such applications, it is important to ensure that the resin composition has a fluidity suitable for injection molding. One key property of the resin composition is thus the melt flow rate (MFR). Suitable adjustment of the MFR is particularly important in cases where the cover is to be formed to a thickness (gauge) of less than 1.0 mm. When the desired MFR can be obtained, the golf ball ultimately produced often is able to achieve both a reduced spin rate and a good durability (scuff resistance).

Various modifiers and additives are typically compounded in resin compositions for golf balls. For example, a number of disclosures relate to the use of compounds having a fluorene skeleton as additives. In one such disclosure, JP-A 2002-509161, a fluorene derivative is included as a visible-light initiator within a golf ball material. In addition, JP-A 2013-94666 and JP-A 2013-94668 teach art that includes, within a core-forming material, an organic fluorescent material selected from a group of compounds having fluorene skeletons.

However, the compounds with fluorene skeletons mentioned in these prior-art publications are intended for use as visible-light initiators or organic fluorescent materials. They are not intended for use in adjusting the melt flow rate of resin compositions.

Also, JP No. 4514491 discloses art which, in order to reclaim plastic materials containing spent (used) polymer, ensures practical properties such as flame retardancy and mechanical characteristics by including, as a compatibilizing agent, a compound having a fluorene skeleton.

However, the foregoing art neither teaches nor even mentions the ability to both ensure a good fluidity and also achieve ball properties such as a reduced ball spin rate and good scuff resistance by including a compound having a fluorene skeleton within a golf ball resin material, particularly a resin composition for golf ball covers having a small gauge.

SUMMARY OF THE INVENTION

It is therefore an object of this invention to provide a golf ball in which a specific resin composition, particularly when used as a golf ball cover material, can be properly molded even if the cover gauge is small, enabling the spin rate of the golf ball to be reduced and the ball to be imparted with a good scuff resistance.

As a result of extensive investigations, we have discovered that a golf ball resin composition having an improved fluidity can be obtained by adding a specific amount of (B) a fluorene skeleton-containing compound or a derivative thereof to 100 parts by weight of (A) a thermoplastic resin. As a result, the resin material has a better injection moldability, which in turn makes it possible to endow the golf ball with both a reduced spin rate and a good scuff resistance. In particular, when such a composition is used as a golf ball cover material, the cover can be properly molded even when the cover has a small gauge, thus making it possible to effectively impart the golf ball with a reduced spin rate and a good scuff resistance.

Accordingly the invention provides a golf ball having a core and a cover of at least one layer, wherein the core and/or at least one layer of the cover are formed of a resin composition containing (A) 100 parts by weight of a thermoplastic resin, and (B) 1 to 30 parts by weight of a compound having a fluorene skeleton or a derivative thereof.

In a preferred embodiment, the thermoplastic resin (A) is at least one resin component selected from the group consisting of:

(a-1) binary copolymers of an olefin and an $\alpha,\beta$-unsaturated carboxylic acid of 3 to 8 carbon atoms, (a-2) ionomer resins that are metal ion neutralization products of binary copolymers of an olefin and an $\alpha,\beta$-unsaturated carboxylic acid of 3 to 8 carbon atoms, (a-3) ternary copolymers of an olefin, an $\alpha,\beta$-unsaturated carboxylic acid of 3 to 8 carbon atoms and an $\alpha,\beta$-unsaturated carboxylic acid ester, and (a-4) ionomer resins that are metal ion neutralization products of ternary copolymers of an olefin, an $\alpha,\beta$-unsaturated carboxylic acid of 3 to 8 carbon atoms and an $\alpha,\beta$-unsaturated carboxylic acid ester.

In another preferred embodiment, the thermoplastic resin (A) is at least one resin component selected from the group consisting of:

(a-2) ionomer resins that are metal ion neutralization products of binary copolymers of an olefin and an $\alpha,\beta$-unsaturated carboxylic acid of 3 to 8 carbon atoms, and (a-4) ionomer resins that are metal ion neutralization products of ternary copolymers of an olefin, an $\alpha,\beta$-unsaturated carboxylic acid of 3 to 8 carbon atoms and an $\alpha,\beta$-unsaturated carboxylic acid ester.

In this preferred embodiment, the at least one resin component has an acid content of at least 16 wt %.

In the golf ball of the invention, it is preferable for an ionomer resin having an acid content of at least 16 wt % to account for at least 50 wt % of component (A).

In the inventive golf ball, the compound having a fluorene skeleton or derivative thereof serving as component (B) is preferably a bisphenol or a bisalcohol.

In the golf ball of the invention, the resin composition may further include, per 100 parts by weight of component (A):

(C) from 5 to 120 parts by weight of a fatty acid having a molecular weight of 228 to 1,500 and/or a derivative thereof, and (D) from 0.1 to 17 parts by weight of a basic inorganic metal compounds that can neutralize unneutralized acid groups in components (A) and (C).

The resin composition preferably has a melt flow rate of at least 3.0 g/10 min. Typically, the melt flow rate of the resin composition is at least 1.5 times the melt flow rate of the thermoplastic resin serving as component (A).

In the golf ball of the invention, each cover layer formed of the resin composition preferably has a gauge of from 0.1 to 1.2 mm.

ADVANTAGEOUS EFFECTS OF THE INVENTION

In the golf ball of the invention, the resin composition has an improved injection-moldability, thus enabling the ball to achieve both a reduced spin rate and a good durability (scuff resistance). When this resin composition is used as a golf ball cover material in particular, molding can be properly carried out even when the cover gauge is small, enabling the golf ball to be effectively imparted with a low spin rate and a good durability (scuff resistance).

DESCRIPTION OF THE PREFERRED EMBODIMENTS

The objects, features and advantages of the invention will become more apparent from the following detailed description.

The golf ball of the invention has a core and a cover of at least one layer. The core and/or at least one layer of the cover are formed of a resin composition containing:

(A) a thermoplastic resin, and (B) a compound having a fluorene skeleton or a derivative thereof.

Component (A) is a thermoplastic resin. Illustrative examples include ionomer resins, olefin resins, vinyl resins, polyolefin elastomers (including polyolefins and metallocene polyolefins), polystyrene elastomers, diene polymers, polyacrylate polymers, polyamide elastomers, polyurethane elastomers and polyester elastomers.

The thermoplastic resin of component (A) is preferably at least one resin component selected from the group consisting of (a-1) to (a-4) below:

(a-1) binary copolymers of an olefin and an $\alpha,\beta$-unsaturated carboxylic acid of 3 to 8 carbon atoms, (a-2) ionomer resins that are metal ion neutralization products of binary copolymers of an olefin and an $\alpha,\beta$-unsaturated carboxylic acid of 3 to 8 carbon atoms, (a-3) ternary copolymers of an olefin, an $\alpha,\beta$-unsaturated carboxylic acid of 3 to 8 carbon atoms and an $\alpha,\beta$-unsaturated carboxylic acid ester, and (a-4) ionomer resins that are metal ion neutralization products of ternary copolymers of an olefin, an $\alpha,\beta$-unsaturated carboxylic acid of 3 to 8 carbon atoms and an $\alpha,\beta$-unsaturated carboxylic acid ester.

The olefin used in these resins (a-1) to (a-4) is preferably an olefin having from 2 to 6 carbon atoms, with ethylene being especially preferred. The unsaturated carboxylic acid used in resins (a-1) to (a-4) has from 3 to 8 carbon atoms and is exemplified by acrylic acid and methacrylic acid. The unsaturated carboxylic acid ester used in component (A), although not particularly limited, is preferably a lower alkyl ester, with butyl acrylate (n-butyl acrylate, iso-butyl acrylate) being especially preferred.

The unsaturated carboxylic acid content (acid content) in resins (a-1) to (a-4) above, although not particularly limited, is preferably at least 16 wt %, and more preferably at least 17 wt %, but preferably not more than 21 wt %, and more preferably not more than 20 wt %. When the acid content is lower than this range, moldings of the golf ball material may not have a good resilience. On the other hand, when the acid content is high, the hardness may become excessive, possibly affecting the durability of the ball to impact.

With a resin selected from (a-1) to (a-4) above as the base resin, the resin composition may further include: (C) a fatty acid having a molecular weight of 228 to 1,500 and/or a derivative thereof, and (D) a basic inorganic metal compound that can neutralize unneutralized acid groups in components (A) and (C). The content of component (C) is preferably in the range of 5 to 120 parts by weight per 100 parts by weight of component (A). The content of component (D) is preferably in the range of 0.1 to 17 parts by weight per 100 parts by weight of component (A).

Component (C) and (D) may be, for example, the "fatty acid and/or derivative thereof" and the "basic inorganic metal compound" of the resin compositions described in JP No. 3729243.

Component (B) is a compound having a fluorene skeleton, or a derivative thereof. Specifically, the fluorene skeleton-containing compounds mentioned in JP No. 4514491 may be used as component (B).

The compound having a fluorene skeleton, or the derivative thereof, is preferably a bisphenol or a bisalcohol. Illustrative examples of compounds having a fluorene skeleton or derivatives thereof include 9,9-bis[4-(2-hydroxyethoxy)phenyl]fluorene, 9,9-bis(4-hydroxyphenyl)fluorene and 9,9-bis(4-hydroxy-3-methylphenyl)fluorene.

The content of component (B) is from 1 to 30 parts by weight, and preferably from 3 to 25 parts by weight, per 100 parts by weight of the thermoplastic resin serving as component (A). When this content is too high, the scuff resistance worsens even though the resin composition may have a good fluidity. On the other hand, when this content is too low, the moldability worsens and a reduced spin rate cannot be achieved.

The combined amount of base resin consisting of components (A) and (B) is not particularly limited, although it is recommended that this be at least 60 wt %, preferably at least 70 wt %, more preferably at least 80 wt %, and most preferably at least 90 wt %, of the total amount of the resin composition. When this content is inadequate, the desired effects of the invention may not be obtained.

In addition, optional additives may be suitably included within the resin composition according to the intended use of the composition. For example, when the resin composition for golf balls of the invention is to be used as a cover material, various types of additives, such as fillers (inorganic fillers), organic staple fibers, reinforcing agents, crosslinking agents, colorants, dispersants, antioxidants, ultraviolet absorbers and light stabilizers, may be added to the foregoing ingredients. When such additives are included, the content thereof, per 100 parts by weight of the base resins, is preferably at least 0.1 part by weight, and more preferably at least 0.5 part by weight, but preferably not more than 10 parts by weight, and more preferably not more than 4 parts by weight.

The resin composition can be obtained by mixing the above ingredients using any of various types of mixers, such as a kneading-type single-screw or twin-screw extruder, a Banbury mixer, a kneader or a Labo Plastomill.

The resin composition has a melt flow rate (MFR) of at least 3.0 g/10 min, and preferably at least 3.5 g/10 min. MFR refers here to the melt flow rate measured at a test temperature of 190° C. and under a test load of 21.18 N (2.16 kgf) in accordance with JIS-K7210. At an MFR in this range, a fluidity that is particularly suitable for injection molding can be ensured, improving the moldability and making it possible for the golf balls that are ultimately manufactured to have both a reduced spin rate and a good durability (scuff resistance).

In order for the resin composition to have an improved injection moldability and to fully manifest in the golf ball the desired effect of being able to achieve both a reduced spin rate and a good durability (scuff resistance), it is preferable for the resin composition to have an MFR value which is at least 1.5 times, and preferably at least 1.6 times, the MFR of the thermoplastic resin serving as component (A).

The resin composition can be used as the cover material in a two-piece solid golf ball consisting of a core and a cover that encases the core, or in a multi-piece solid golf ball consisting of a core of at least one layer and a multilayer cover encasing the core.

The core can be formed using a known rubber material as the base material. Known base rubbers such as natural rubbers or synthetic rubbers may be used as the base rubber. More specifically, the use of primarily a polybutadiene, especially cis-1,4-polybutadiene having a cis structure content of at least 40%, is recommended. Within the base rubber, where desired, natural rubber, polyisoprene rubber, styrene-butadiene rubber or the like may be used together with the above polybutadiene.

The polybutadiene may be synthesized using a neodymium catalyst or other rare-earth catalyst, or a metal catalyst such as a cobalt catalyst or nickel catalyst.

Co-crosslinking agents such as unsaturated carboxylic acids and metal salts thereof, inorganic fillers such as zinc oxide, barium sulfate and potassium carbonate, and organic peroxides such as dicumyl peroxide and 1,1,-bis(t-butylperoxy)cyclohexane may be included in the above base rubber. Where necessary, a commercial antioxidant may also be suitably added.

The core has a diameter which, although not particularly limited, is preferably at least 20 mm, more preferably at least 25 mm, and even more preferably at least 30 mm. The upper limit is preferably not more than 41 mm, and more preferably not more than 40 mm.

The core deflection, which is the amount of deformation by the core when compressed under a final load of 1,275 N (130 kgf) from an initial load of 98 N (10 kgf), is preferably at least 2.0 mm, more preferably at least 2.5 mm, and even more preferably at least 3.0 mm. The upper limit is preferably not more than 6.0 mm, and more preferably not more than 5.0 mm. When the amount of deformation is too small, the feel of the ball at impact may be too hard. On the other hand, when the amount of deformation is too large, the feel at impact may be too soft or the durability of the ball to cracking when repeatedly struck may worsen.

The cover is formed of at least one layer. When the cover consists of a plurality of layers, in addition to an outermost layer, it includes also at least an intermediate layer interposed between the outermost layer and the core. Accordingly, the cover may be a two-layer cover consisting of, in order from the inside: an intermediate layer and an outermost layer. In addition, an envelope layer may be provided between the core and the intermediate layer. In this case, the cover may be a three-layer cover consisting of, in order from the inside: an envelope layer, an intermediate layer and an outermost layer.

Each layer of the cover has a gauge which, although not particularly limited, is preferably at least 0.1 mm, more preferably at least 0.3 mm, and even more preferably at least 0.5 mm. The upper limit is preferably not more than 1.2 mm, more preferably not more than 1.1 mm, and even more preferably not more than 1.0 mm.

Each layer of the cover has a Shore D hardness which, although not particularly limited, is preferably at least 30, and more preferably at least 40. The upper limit is preferably not more than 75, more preferably not more than 70, and even more preferably not more than 65.

The ball deflection, which is the amount of deformation by the ball when compressed under a final load of 1,275 N (130 kgf) from an initial load of 98 N (10 kgf), is preferably at least 2.0 mm, and more preferably at least 2.5 mm. The upper limit is preferably not more than 4.0 mm, and more preferably not more than 3.8 mm. When the amount of deformation is too small, the feel of the ball at impact may be too hard. On the other hand, when the amount of deformation is too large, the feel at impact may be too soft or the durability of the ball to cracking when repeatedly struck may worsen.

Numerous dimples of one, two or more types may be formed on the surface of the cover. In addition, various types of coatings may be applied to the cover surface. Given the need for the golf ball to withstand harsh conditions of use, preferred examples of such coatings include two-part curing urethane coatings, especially non-yellowing urethane coatings.

EXAMPLES

Working Examples and Comparative Examples are provided below to illustrate the invention, and are not intended to limit the scope thereof.

Working Examples 1 to 7, Comparative Examples 1 to 7

Solid cores were produced by using the two types of rubber compositions I and II shown in Table 1 below and vulcanizing for 15 minutes at 155° C.

TABLE 1

|  | Rubber formulations (pbw) | |
| --- | --- | --- |
|  | I | II |
| BR01 | 80 | 80 |
| BR51 | 20 | 20 |
| Barium sulfate | 26.8 | 25.6 |
| Zinc white | 4.0 | 4.0 |
| Zinc stearate | 5.0 | 5.0 |
| Nocrac NS-6 | 0.1 | 0.1 |
| Zinc salt of pentachlorothiophenol | 1.0 | 1.0 |
| Zinc acrylate (ZDA) | 23.0 | 26.0 |
| Percumyl D | 0.6 | 0.6 |
| Perhexa C40 | 1.2 | 1.2 |

Details on the above core formulations I and II are given below.

BR01: cis-1,4-Polybutadiene rubber available under this trade name from JSR Corporation.

BR51: cis-1,4-Polybutadiene rubber available under this trade name from JSR Corporation.

Barium sulfate: Available from Sakai Chemical Co., Ltd.
Zinc white (zinc oxide):
  Available from Sakai Chemical Co., Ltd.
Zinc stearate: Available from Wako Pure Chemical Industries, Ltd.
Nocrac NS-6: 2,2'-Methylenebis(4-methyl-6-t-butylphenol) available under this trade name from Ouchi Shinko Chemical Industry Co., Ltd.
Zinc salt of pentachlorothiophenol:
  Available from Wako Pure Chemical Industries, Ltd.
Zinc acrylate: Available from Wako Pure Chemical Industries, Ltd.
Percumyl D: Dicumyl peroxide available under this trade name from NOF Corporation
Perhexa C-40: A mixture of 1,1-di(tert-butylperoxy)cyclohexane and silica available under this trade name from NOF Corporation.

Next, in Working Examples 1 to 7 and Comparative Examples 1 to 7, first, the resin indicated as "A" in Table 2 below was injected into a mold in which the solid core had been placed, thereby giving a sphere consisting of the solid core encased by an intermediate layer having a gauge of 1.45 mm. Next, in the respective Examples, one of the resin compositions indicated as "B" to "K" in Table 2 below was mixed and extruded with a kneading-type twin-screw extruder to give a pelletized resin composition, which was then injected into a mold in which the sphere had been placed, thus forming an outermost layer having a gauge of 1.00 mm or 1.25 mm and producing a three-piece solid golf ball. Dimples common to all the Examples were formed on the surface of the cover.

least two weeks, following which the Shore D hardness was measured in accordance with ASTM D2240-95.

MFR (g/10 min) of Cover Resin Composition

The melt flow rate was measured at a test temperature of 190° C. and under a test load of 21.18 N (2.16 kgf) in accordance with JIS-K7210.

Using the methods described below, the core and ball diameter and deflection were measured for each of the golf balls thus obtained, in addition to which the spin rate-lowering properties, scuff resistance and moldability of the ball were evaluated.

Core and Golf Ball Diameter

The diameters at five random dimple-free areas on the surface of a ball were measured at a temperature of 23.9±1° C. and, using the average of these measurements as the measured value for a single ball, the average diameter for five measured balls was determined. The diameters of the cores were measured in the same way.

Golf Ball Deflection

The golf ball was placed on a hard plate and the amount of deflection when compressed under a final load of 1,275 N (130 kgf) from an initial load of 98 N (10 kgf) was measured. The amount of deflection here refers in each case to the measured value obtained after holding the ball isothermally at 23.9° C.

Moldability

The injection moldability of each golf ball was rated as follows.

Good: Molding can be carried out without difficulty.
  NG: The cover material cannot be molded, or stable molding is impossible, resulting in eccentricity or the like.

TABLE 2

| Resin composition (pbw) | | A | B | C | D | E | F | G | H | I | J | K |
|---|---|---|---|---|---|---|---|---|---|---|---|---|
| Base resin | HPF 1000 | 100 | | | | | | | | | | |
| | Himilan AM 7318 | | 75 | 75 | 75 | 75 | 75 | 75 | 50 | 50 | 25 | 25 |
| | Himilan AM 7327 | | 25 | 25 | 25 | 25 | 25 | 25 | 50 | 50 | 75 | 75 |
| Fluorene MF-11 | | | | 3 | 5 | 10 | 20 | 40 | | 10 | | 10 |
| Physical properties | Shore D hardness | 51 | 62 | 63 | 63 | 63 | 64 | 65 | 57 | 58 | 52 | 53 |
| | MFR (g/10 min) | 0.65 | 2.2 | 3.3 | 3.5 | 4.3 | 5.1 | 6.2 | 2.3 | 4.4 | 2.5 | 4.6 |
| | MFR ratio | — | 1.0 | 1.5 | 1.6 | 2.0 | 2.3 | 2.8 | 1.0 | 1.9 | 1.0 | 1.8 |

* In the table, "MFR ratio" = MFR of resin composition/MFR of base resin.

Details on the materials mentioned in Table 2 are given below.
HPF 1000: HPF™ 1000, available from E.I. DuPont de Nemours & Co., Ltd.
Himilan AM 7318: A sodium-neutralized ionomer available from DuPont-Mitsui Polychemicals Co., Ltd.; acid content, 18 wt %; MFR, 2.2 g/10 min
Himilan AM 7327: A zinc-neutralized ionomer available from DuPont-Mitsui Polychemicals Co., Ltd.; acid content, 9 wt %; MFR, 2.5 g/10 min
Fluorene MF-11: A compound having a fluorene skeleton, available from Osaka Gas Chemicals Co., Ltd.

Shore D Hardness of Cover Material

The cover material (resin composition) was molded into a sheet having a thickness of 2 mm and left to stand for at Spin Rate of Ball (rpm)

The ball was struck at a head speed (HS) of 45 m/s with a club mounted on a swing robot, immediately after which the backspin rate of the ball was measured with an apparatus for measuring initial conditions.

Scuff Resistance

The golf balls were held isothermally at 23° C. and five balls of each type were hit at a head speed of 33 m/s using as the club a pitching wedge mounted on a swing robot machine. The damage to the ball from the impact was visually rated according to the following criteria. The average rating for each type of ball is indicated in the table.

Exc: No damage or substantially no damage.
  Good: Damage is apparent but so slight as to be of substantially no concern.
  NG: Some fraying of surface or loss of dimples.

TABLE 3

| | | Working Example | | | | | | |
|---|---|---|---|---|---|---|---|---|
| | | 1 | 2 | 3 | 4 | 5 | 6 | 7 |
| Core | Material | I | I | I | II | I | I | I |
| | Diameter (mm) | 37.8 | 37.8 | 37.8 | 37.8 | 37.8 | 37.8 | 37.8 |
| Intermediate layer | Material | A | A | A | A | A | A | A |
| | Gauge (mm) | 1.45 | 1.45 | 1.45 | 1.45 | 1.45 | 1.45 | 1.45 |
| Outermost layer | Material | C | D | E | E | F | I | K |
| | Gauge (mm) | 1.00 | 1.00 | 1.00 | 1.00 | 1.00 | 1.00 | 1.00 |
| Finished ball | Diameter (mm) | 42.7 | 42.7 | 42.7 | 42.7 | 42.7 | 42.7 | 42.7 |
| | Deflection (mm) | 3.2 | 3.2 | 3.2 | 2.9 | 3.1 | 3.3 | 3.4 |
| Performance tests | Moldability | Good | Good | Good | Good | Good | Good | Good |
| | Spin rate (rpm), W#1 | 2,570 | 2,560 | 2,560 | 2,640 | 2,560 | 2,600 | 2,640 |
| | Scuff resistance | Exc | Exc | Exc | Exc | Good | Good | Good |

TABLE 4

| | | Comparative Example | | | | | | |
|---|---|---|---|---|---|---|---|---|
| | | 1 | 2 | 3 | 4 | 5 | 6 | 7 |
| Core | Material | I | I | I | I | I | II | I |
| | Diameter (mm) | 37.3 | 37.8 | 37.8 | 37.8 | 37.3 | 37.3 | 37.3 |
| Intermediate layer | Material | A | A | A | A | A | A | A |
| | Gauge (mm) | 1.45 | 1.45 | 1.45 | 1.45 | 1.45 | 1.45 | 1.45 |
| Outermost layer | Material | B | B | G | H | H | H | J |
| | Gauge (mm) | 1.25 | 1.00 | 1.00 | 1.00 | 1.25 | 1.25 | 1.25 |
| Finished ball | Diameter (mm) | 42.7 | 42.7 | 42.7 | 42.7 | 42.7 | 42.7 | 42.7 |
| | Deflection (mm) | 3.2 | — | 3.0 | — | 3.3 | 3.0 | 3.4 |
| Performance tests | Moldability | Good | NG | Good | NG | Good | Good | Good |
| | Spin rate (rpm), W#1 | 2,610 | — | 2,560 | — | 2,660 | 2,750 | 2,700 |
| | Scuff resistance | Exc | — | NG | — | Good | Good | Good |

From Tables 3 and 4, it is apparent that the golf balls in Comparative Examples had the following drawbacks.

In Comparative Example 1, although molding was carried out to a cover gauge at which stable molding is possible, compared with Working Examples 1 to 3 and 5 in which the same base resin formulations were used in the cover, the spin rate of the ball on shots with a driver (W#1) was somewhat high.

In Comparative Example 2, the resin composition had a low melt flow rate, as a result of which the ball could not be stably molded.

In Comparative Example 3, the amount of compound having a fluorene skeleton added was high, resulting in a poor scuff resistance.

In Comparative Example 4, the melt flow rate of the resin composition was low, as a result of which the ball could not be stably molded.

In Comparative Example 5, although molding was carried out to a cover gauge at which stable molding is possible, compared with Working Example 6 in which the same base resin formulations were used in the cover, the spin rate of the ball when hit with a driver (W#1) was high.

In Comparative Example 6, although molding was carried out to a cover gauge at which stable molding is possible, the spin rate of the ball on shots with a driver (W#1) was high.

In Comparative Example 7, although molding was carried out to a cover gauge at which stable molding is possible, compared with Working Example 7 in which the same base resin formulations were used in the cover, the spin rate of the ball when hit with a driver (W#1) was high.

Japanese Patent Application No. 2016-124406 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core and a cover of at least one layer, wherein the outermost layer of the cover is formed of a resin composition comprising:
   (A) 100 parts by weight of a thermoplastic resin, and
   (B) 1 to 30 parts by weight of a compound having a fluorene skeleton or a derivative thereof,
   wherein the thermoplastic resin (A) is at least one resin component selected from the group consisting of:
   (a-1) binary copolymers of an olefin and an α,β-unsaturated carboxylic acid of 3 to 8 carbon atoms,
   (a-2) ionomer resins that are metal ion neutralization products of binary copolymers of an olefin and an α,β-unsaturated carboxylic acid of 3 to 8 carbon atoms,
   (a-3) ternary copolymers of an olefin, an α,β-unsaturated carboxylic acid of 3 to 8 carbon atoms and an α,β-unsaturated carboxylic acid ester, and
   (a-4) ionomer resins that are metal ion neutralization products of ternary copolymers of an olefin, an α,β-unsaturated carboxylic acid of 3 to 8 carbon atoms and an α,β-unsaturated carboxylic acid ester.

2. The golf ball of claim 1, wherein the thermoplastic resin (A) is at least one resin component selected from the group consisting of:
   (a-2) ionomer resins that are metal ion neutralization products of binary copolymers of an olefin and an α,β-unsaturated carboxylic acid of 3 to 8 carbon atoms, and (a-4) ionomer resins that are metal ion neutralization products of ternary copolymers of an olefin, an α,β-unsaturated carboxylic acid of 3 to 8 carbon atoms and an α,β-unsaturated carboxylic acid ester;

and said at least one resin component has an acid content of at least 16 wt %.

3. The golf ball of claim 1, wherein an ionomer resin having an acid content of at least 16 wt % accounts for at least 50 wt % of component (A).

4. The golf ball of claim 1, wherein said compound having a fluorene skeleton or derivative thereof serving as component (B) is a bisphenol or a bisalcohol.

5. The golf ball of claim 1, wherein the resin composition further comprises, per 100 parts by weight of component (A):
   (C) from 5 to 120 parts by weight of a fatty acid having a molecular weight of 228 to 1,500 or a derivative thereof or both, and
   (D) from 0.1 to 17 parts by weight of a basic inorganic metal compound that can neutralize unneutralized acid groups in components (A) and (C).

6. The golf ball of claim 1, wherein the resin composition has a melt flow rate of at least 3.0 g/10 min.

7. The golf ball of claim 6, wherein the melt flow rate of the resin composition is at least 1.5 times the melt flow rate of the thermoplastic resin serving as component (A).

8. The golf ball of claim 1, wherein the outermost layer of the cover has a gauge of from 0.1 to 1.2 mm.

9. The golf ball of claim 1, wherein the lower limit of the content of component (B) is 10 parts by weight, per 100 parts by weight of the thermoplastic resin serving as component (A).

* * * * *